(12) United States Patent
Kuo et al.

(10) Patent No.: US 11,689,108 B2
(45) Date of Patent: Jun. 27, 2023

(54) CONTROLLER FOR CONTROLLING A RESONANT CONVERTER

(71) Applicant: O2Micro Inc., Santa Clara, CA (US)

(72) Inventors: Ching-Chuan Kuo, Taipei (TW); Sin-Yan Wu, Taipei (TW); Sheng-Tai Lee, Taipei (TW); Yung-Lin Lin, Palo Alto, CA (US)

(73) Assignee: O2Micro Inc., Santa Clara, CA (US)

(*) Notice: Subject to any disclaimer, the term of this patent is extended or adjusted under 35 U.S.C. 154(b) by 0 days.

(21) Appl. No.: 17/518,466

(22) Filed: Nov. 3, 2021

(65) Prior Publication Data
US 2023/0136279 A1    May 4, 2023

(51) Int. Cl.
*H02M 3/335* (2006.01)
*H02M 3/337* (2006.01)
*H02M 3/00* (2006.01)
*H02M 1/00* (2006.01)

(52) U.S. Cl.
CPC ......... *H02M 3/33523* (2013.01); *H02M 3/01* (2021.05); *H02M 3/3376* (2013.01); *H02M 3/33546* (2013.01); *H02M 1/0009* (2021.05)

(58) Field of Classification Search
CPC .. H02M 3/3376; H02M 3/01; H02M 3/33523; H02M 3/33546; H02M 1/0009
See application file for complete search history.

(56) References Cited

U.S. PATENT DOCUMENTS

| | | | | |
|---|---|---|---|---|
| 6,259,615 B1* | 7/2001 | Lin | ...................... | H02M 7/5387 315/225 |
| 6,333,624 B1* | 12/2001 | Ball | .................. | H02M 3/33523 363/21.01 |
| 8,102,164 B2* | 1/2012 | Colbeck | .............. | H02M 1/4225 323/282 |
| 8,179,105 B2* | 5/2012 | Lipcsei | ............... | H02M 3/1588 323/283 |
| 9,030,122 B2* | 5/2015 | Yan | ........................ | H05B 45/14 315/307 |
| 9,705,408 B2* | 7/2017 | Quigley | ................... | H02M 1/36 |
| 9,912,243 B2* | 3/2018 | Quigley | ............ | H02M 3/33515 |
| 10,003,267 B1* | 6/2018 | Zhao | ................. | H02M 3/33573 |
| 10,069,403 B1* | 9/2018 | Lim | ................... | H02M 3/33571 |
| 10,673,339 B2* | 6/2020 | Seeman | ............ | H02M 3/33546 |
| 10,715,039 B1* | 7/2020 | Ilango | .................. | G01R 19/175 |
| 2002/0067629 A1* | 6/2002 | Koike | ............... | H02M 3/33523 363/97 |

(Continued)

*Primary Examiner* — Yusef A Ahmed

(57) ABSTRACT

A controller includes a first sensing pin receiving a first sensing signal indicating a level of an input voltage of a resonant converter, a second sensing pin receiving a second sensing signal indicating a level of an input current of the resonant converter, a feedback pin receiving a feedback signal indicating a level of an output voltage of the resonant converter, and a first driving pin and a second driving pin controlling a high side switch and a low side switch of the resonant converter, respectively. The controller generates a compensated signal based on the first sensing signal, compares the compensated signal with a peak value of the second sensing signal to generate a first comparison result, compares the feedback signal with a threshold to generate a second comparison result, and controls the high side low side switches based on the first and the second comparison results.

15 Claims, 6 Drawing Sheets

(56) References Cited

U.S. PATENT DOCUMENTS

| | | | | |
|---|---|---|---|---|
| 2004/0160794 | A1* | 8/2004 | Lin | H02M 7/5387 363/98 |
| 2006/0158271 | A1* | 7/2006 | Juang | H03B 5/04 331/74 |
| 2008/0198638 | A1* | 8/2008 | Reinberger | H02M 3/3376 363/21.02 |
| 2009/0091957 | A1* | 4/2009 | Orr | H02M 3/3376 363/79 |
| 2010/0208500 | A1* | 8/2010 | Yan | H02M 3/33523 363/21.12 |
| 2011/0157920 | A1* | 6/2011 | Adragna | H02M 3/3376 363/21.03 |
| 2011/0267844 | A1* | 11/2011 | He | H02M 3/3378 363/21.02 |
| 2012/0099344 | A1* | 4/2012 | Adragna | H02M 3/3372 363/21.02 |
| 2013/0169182 | A1* | 7/2013 | Park | H02M 3/33507 363/21.01 |
| 2013/0193877 | A1* | 8/2013 | Kuo | H05B 45/375 315/307 |
| 2013/0301311 | A1* | 11/2013 | Wang | H02M 3/33507 363/21.13 |
| 2014/0016358 | A1* | 1/2014 | Li | H02M 3/33523 324/679 |
| 2014/0177290 | A1* | 6/2014 | Zhang | H02M 3/33507 363/21.13 |
| 2014/0198538 | A1* | 7/2014 | Kimura | H02M 3/33507 363/21.09 |
| 2014/0226368 | A1* | 8/2014 | Kimura | H02M 3/33507 363/21.09 |
| 2014/0226369 | A1* | 8/2014 | Kimura | H02M 3/3376 363/21.09 |
| 2014/0334193 | A1* | 11/2014 | Meyer | H02M 7/537 363/21.01 |
| 2015/0022109 | A1* | 1/2015 | Lee | H05B 45/395 315/200 R |
| 2015/0043252 | A1* | 2/2015 | Kuang | H02M 3/33507 363/21.16 |
| 2015/0357927 | A1* | 12/2015 | Zhang | H02M 3/33507 363/21.02 |
| 2015/0372605 | A1* | 12/2015 | Karlsson | G05F 1/10 363/21.06 |
| 2016/0226388 | A1* | 8/2016 | Ren | H02M 3/33507 |
| 2017/0093296 | A1* | 3/2017 | Chen | H02M 1/088 |
| 2017/0110973 | A1* | 4/2017 | Chen | H03L 7/00 |
| 2017/0288551 | A1* | 10/2017 | Hwang | H01F 27/004 |
| 2017/0288557 | A1* | 10/2017 | Fang | H02M 1/4258 |
| 2017/0353122 | A1* | 12/2017 | Su | H02M 3/33523 |
| 2018/0262119 | A1* | 9/2018 | Ouyang | H02M 3/33576 |
| 2019/0115835 | A1* | 4/2019 | Cohen | H02M 3/157 |
| 2020/0007043 | A1* | 1/2020 | Miao | H02M 3/33523 |
| 2020/0195124 | A1* | 6/2020 | Mayell | H02M 3/3376 |
| 2020/0195154 | A1* | 6/2020 | Mayell | H02M 3/33571 |
| 2020/0195155 | A1* | 6/2020 | Colbeck | H02M 1/36 |
| 2020/0287457 | A1* | 9/2020 | Su | H02M 3/01 |
| 2021/0028695 | A1* | 1/2021 | Su | H02M 3/01 |
| 2021/0242789 | A1* | 8/2021 | Su | H02M 3/33523 |
| 2021/0408921 | A1* | 12/2021 | Yang | H02M 3/01 |
| 2022/0166327 | A1* | 5/2022 | Liu | H02M 1/0025 |
| 2022/0209665 | A1* | 6/2022 | Li | H02M 1/0009 |
| 2022/0247320 | A1* | 8/2022 | Stracquadaini | H02M 3/33569 |

* cited by examiner

CONTROLLER FOR CONTROLLING A RESONANT CONVERTER

BACKGROUND

A conventional resonant converter converts an input voltage to an output voltage by controlling a frequency of a switching circuit in the resonant converter. When the resonant converter is operated in the inductive region, the output voltage of the resonant converter decreases when the frequency increases because a gain of the resonant converter decreases as the frequency increases, where the gain is a ratio of the output voltage to the input voltage. On the other hand, the rate of decrease of the gain becomes less significant when the frequency further increases, which means it is difficult to decrease the output voltage if the frequency is above a certain level, e.g., greater than 100 KHz, when a lower output voltage is desired. As a result, if the resonant converter receives a relatively high input voltage while a low output voltage is required, the resonant converter may not be able to efficiently regulate its output voltage to a target level. Therefore, a conventional resonant converter is only suitable to operate within a narrow input voltage range (e.g., 90 $V_{AC}$ to 145 $V_{AC}$).

SUMMARY

Disclosed are embodiments of a controller for controlling a resonant converter. The controller includes a first sensing pin, a second sensing pin, a feedback pin, a first driving pin and a second driving pin. The first driving pin is operable for receiving a first sensing signal indicating a level of an input voltage of the resonant converter provided by a power source. The resonant converter receives the input voltage and provides an output voltage. The second sensing pin is operable for receiving a second sensing signal indicating a level of an input current of the resonant converter. The feedback pin is operable for receiving a feedback signal indicating a level of the output voltage. The first driving pin and the second driving pin are operable for controlling a high side switch and a low side switch of the resonant converter, respectively. The controller is operable for generating a compensated signal based on the first sensing signal, comparing the compensated signal with a peak value of the second sensing signal to generate a first comparison result, comparing the feedback signal with a threshold to generate a second comparison result, and controlling the high side switch and the low side switch based on the first and the second comparison results.

In other embodiments, a controller for controlling a resonant converter includes a mode selection unit, a peak detector and a compensation unit. The mode selection unit is operable for selecting a mode among a first, a second and a third mode based on a first sensing signal and a second sensing signal and for controlling the controller to operate in the selected mode, where the first sensing signal indicates a level of an input voltage of the resonant converter, and where the second sensing signal indicates a level of an input current of the resonant converter. The peak detector is operable for detecting a peak value of the second sensing signal. The compensation unit is operable for generating a compensated signal based on the first sensing signal, where the compensated signal is inversely proportional to the first sensing signal if the input voltage of the resonant converter is within a predetermined range. The mode selection unit is operable for comparing the compensated signal with the peak value of the second sensing signal to generate a first comparison result, comparing a feedback signal with a threshold to generate a second comparison result, and determining the selected mode based on the first and the second comparison results. The feedback signal indicates a level of an output voltage of the resonant converter.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail to avoid obscuring aspects of the present invention.

Figure 1:
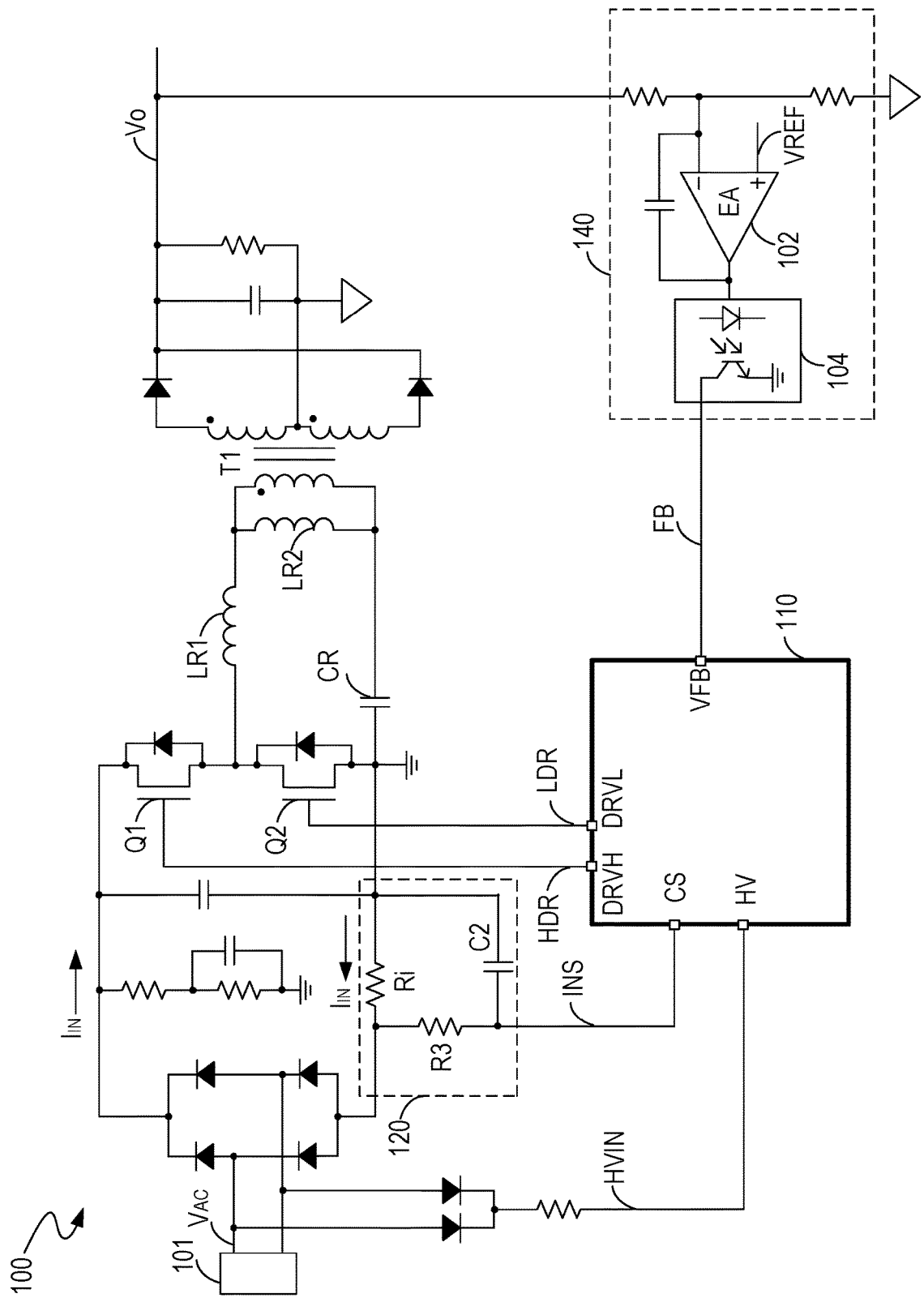
FIG. 1 shows a resonant converter controlled by a controller, in accordance with embodiments of the present invention.

FIG. 1 shows a circuit 100 including a resonant converter controlled by a controller 110, in accordance with embodiments of the present invention. The resonant converter receives an input voltage $V_{AC}$ from a power source 101 and converts the input voltage $V_{AC}$ to an output voltage $V_O$. The resonant converter includes a switching circuit, a resonant tank and a transformer T1. The switching circuit includes a high side switch Q1 and a low side switch Q2. In operation, a conductance status of the high side switch Q1 and a conductance status of the low side switch Q2 are complementary. In other words, when switch Q1 is turned on, switch Q2 is off, and vice versa. The resonant tank includes a first resonant inductor LR1, a second resonant inductor LR2 and a resonant capacitor CR.

In an embodiment, the controller 110 includes a first sensing pin HV, a second sensing pin CS, a feedback pin VFB, a first driving pin DRVH and a second driving pin DRVL. The first sensing pin HV is coupled to the power source 101 for receiving a first sensing signal HVIN indicating a level of the input voltage $V_{AC}$ that is provided by the power source 101. The second sensing pin CS is coupled to the resonant converter through a current detecting circuit 120. The second sensing pin CS receives a second sensing signal INS. The second sensing signal INS indicates a level of an input current $I_{IN}$ of the resonant converter and further indicates a load condition. The feedback pin VFB is coupled to an output terminal of the resonant converter through a feedback circuit 140 for receiving a feedback signal FB indicating a level of the output voltage $V_O$ of the resonant converter. In an embodiment, the feedback circuit 140 includes an amplifier 102 and an optical coupler 104. The first driving pin DRVH and the second driving pin DRVL are coupled to the high side switch Q1 and the low side switch Q2, and is operable for controlling (e.g., turning on or off) the high side switch Q1 and the low side switch Q2, respectively. The controller 110 is operable for adjusting a frequency of the high side switch Q1 and a frequency of the low side switch Q2 based on the feedback signal FB.

In operation, the controller 110 is operable for: generating a compensated signal VP based on the first sensing signal HVIN, comparing the compensated signal VP with a peak value INSPK of the second sensing signal INS to generate a first comparison result, comparing the feedback signal FB with a threshold VH to generate a second comparison result, and controlling the high side switch Q1 and the low side switch Q2 based on the first and the second comparison results.

Figure 2:
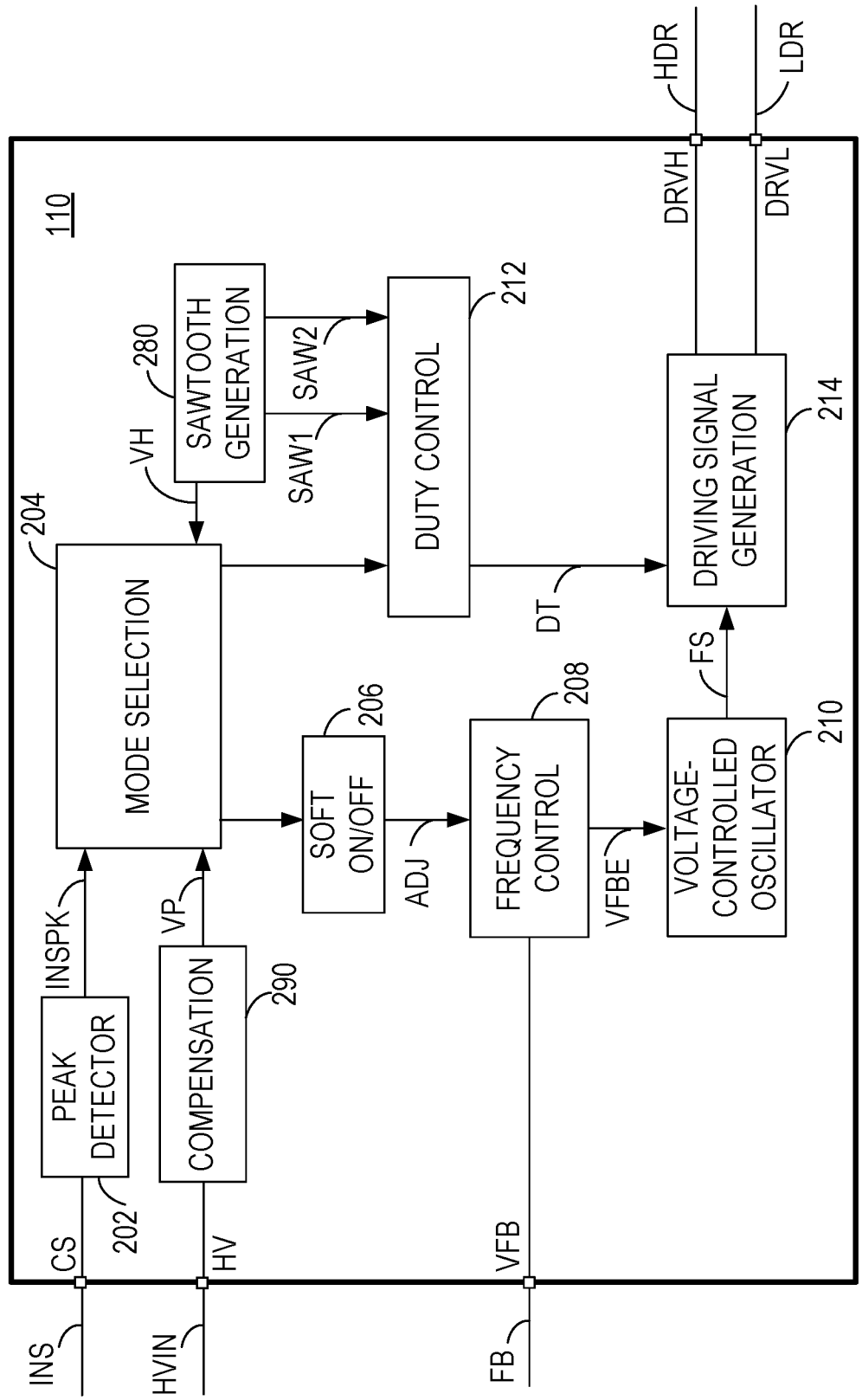
FIG. 2 shows a block diagram of a controller for controlling a resonant converter, in accordance with embodiments of the present invention.

FIG. 2 shows a block diagram of the controller 110 in FIG. 1, in accordance with embodiments of the present invention. In the FIG. 2 embodiments, the controller 110 includes a peak detector 202, a compensation unit 290, a mode selection unit 204, a soft on/off unit 206, a frequency control unit 208, a voltage-controlled oscillator 210, a sawtooth generation unit 280, a duty control unit 212 and a driving signal generation unit 214.

The sawtooth generation unit 280 is operable for generating a first sawtooth signal SAW1 and a second sawtooth signal SAW2. The peak detector 202 is coupled to the second sensing pin CS, and includes circuitry that is operable for detecting the peak value INSPK of the second sensing signal INS. The compensation unit 290 is coupled to the first sensing pin HV, and is operable for generating the compensation signal VP based on the first sensing signal HVIN, where the compensation signal VP is inversely related to (e.g., inversely proportional to) the first sensing signal HVIN if the input voltage of the resonant converter is within a predetermined range (e.g., 90 Vac to 265 Vac). Here, inversely related or proportional to means if the first sensing signal HVIN increases, then the compensation signal VP decreases, and vice versa. In an embodiment, the voltage level of the compensation signal VP can be obtained according to equation (1), $$VP = K - F \times HVIN \tag{1}$$

where K and F are constants that are empirically determined. The mode selection unit 204 is coupled to the first sensing pin HV through the compensation unit 290 and coupled to the second sensing pin CS through the peak detector 202. The mode selection unit 204 is operable for selecting a mode among a first mode (normal mode), a second mode (high frequency burst mode), and a third mode (low frequency burst mode), based on the first sensing signal HVIN and the second sensing signal INS, and is also operable for controlling the controller 110 to operate in the selected mode.

More specifically, the mode selection unit 204 selects the first mode if the peak value INSPK of the second sensing signal INS is greater than the compensated signal VP and the feedback signal FB is greater than a threshold VH. In an embodiment, the threshold VH is a peak value of the first sawtooth signal SAW1 generated by the sawtooth generation unit 280. The mode selection unit 204 selects the second mode if the peak value INSPK of the second sensing signal INS is greater than the compensated signal VP and the feedback signal FB is less than the threshold VH. The mode selection unit 204 selects the third mode if the peak value INSPK of the second sensing signal INS is less than the compensated signal VP.

Figure 3:
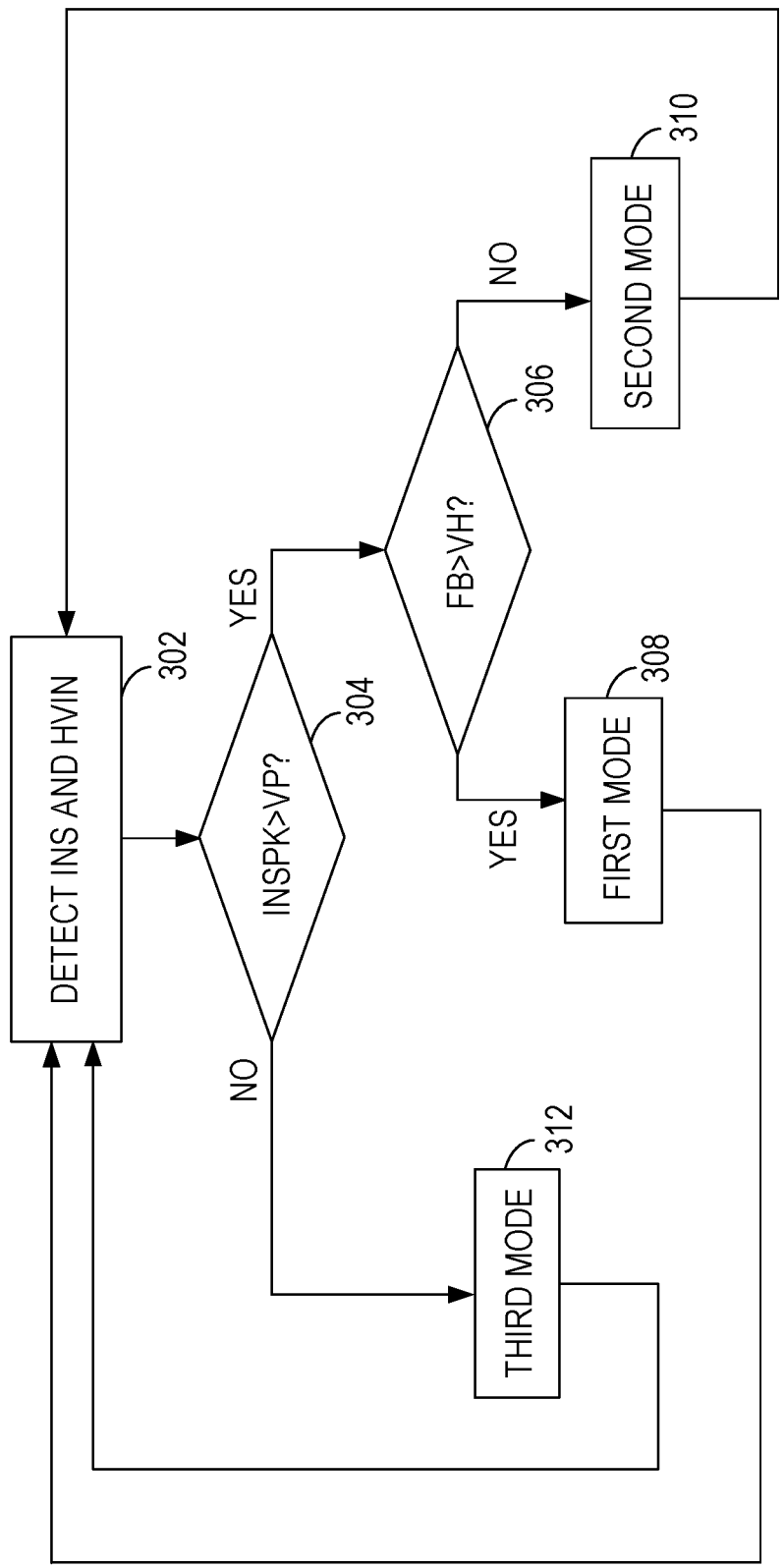
FIG. 3 shows a flowchart illustrating operations of a controller for controlling a resonant converter, in accordance with embodiments of the present invention.

FIG. 3 shows a flowchart illustrating operations of the controller 110 in FIG. 2, in accordance with embodiments of the present invention.

In step 302, the controller 110 detects a level of the first sensing signal HVIN and a level of the second sensing signal INS. The first sensing signal HVIN indicates a level of an input voltage $V_{AC}$ of a resonant converter. The second sensing signal INS indicates a level of an input current $I_{IN}$ of the resonant converter. The controller 110 further generates the compensated signal VP based on the first sensing signal HVIN, and detects a peak value INSPK of the second sensing signal INS.

In step 304, the controller 110 compares the peak value INSPK with the compensated signal VP. If the peak value INSPK is greater than the compensated signal VP, the flowchart goes to step 306; otherwise, the flowchart goes to step 312. In step 312, the controller 110 enters the third mode.

In step 306, the controller 110 compares the feedback signal FB indicating a level of the output voltage $V_O$ of the resonant converter with the threshold VH. If the feedback signal FB is greater than the threshold VH, the flowchart goes to step 308; otherwise, the flowchart goes to step 310. In step 308, the controller 110 enters the first mode. In step 310, the controller 110 enters the second mode.

The steps 304-312 shown in FIG. 3 can be performed by the mode selection unit 204 in FIG. 2. The mode selection unit 204 can include multiple comparators and logic circuit (not shown) to generate the comparison results and perform mode selection steps.

Figure 4A:
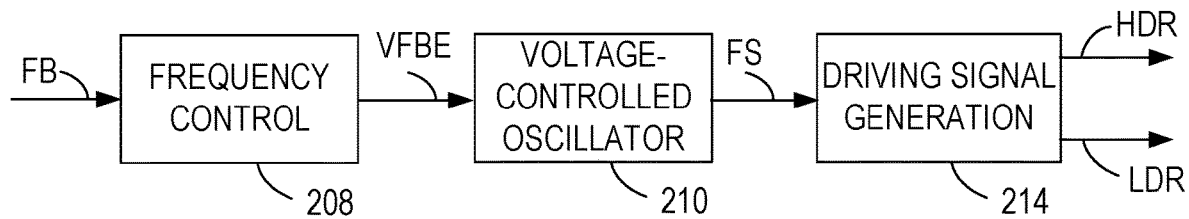
FIG. 4A shows components in a controller associated with a first mode, in accordance with embodiments of the present invention.
Figure 4B:
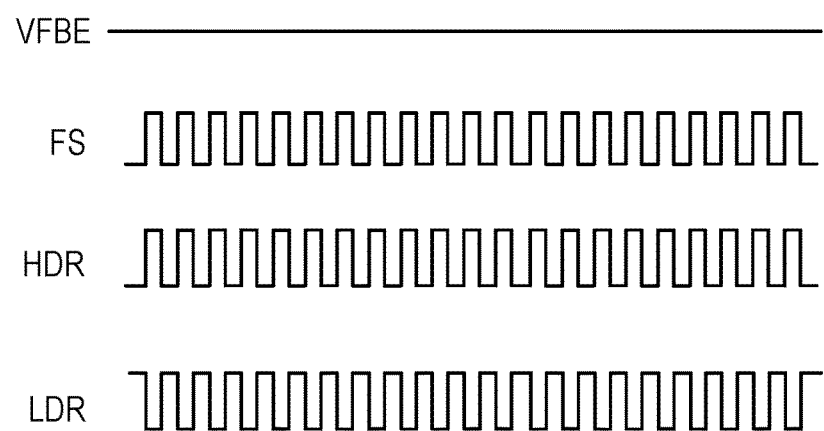
FIG. 4B shows signal waveforms of a controller associated with a first mode, in accordance with embodiments of the present invention.

FIG. 4A shows components in the controller 110 associated with the first mode, in accordance with embodiments of the present invention. FIG. 4B shows signal waveforms of the controller 110 associated with the first mode, in accordance with embodiments of the present invention. FIGS. 4A and 4B are described in combination with FIG. 2.

In the first mode (normal mode), the frequency control unit 208 receives the feedback signal FB from the feedback pin VFB, and generates a frequency control signal VFBE based on the feedback signal FB. The voltage-controlled oscillator 210 is coupled to the frequency control unit 208, and generates a switching signal FS having a frequency for controlling the high side switch Q1 and the low side switch Q2 based on the frequency control signal VFBE. In an embodiment, the frequency of the switching signal FS is inversely proportional to a level of the frequency control signal VFBE. The driving signal generation unit 214 receives the switching signal FS, and generates the first driving signal HDR and the second driving signal LDR to control the high side switch Q1 and the low side switch Q2, respectively. In an embodiment, as shown in FIG. 4B, the first driving signal HDR and the second driving signal LDR have the same frequency as that of the switching signal FS, while the second driving signal LDR is phase-inverted relative to the first driving signal HDR, such that the high side switch Q1 and the low side switch Q2 are alternately turned on and a conductance status of the high side switch Q1 and a conductance status of the low side switch Q2 are complementary.

Figure 5A:
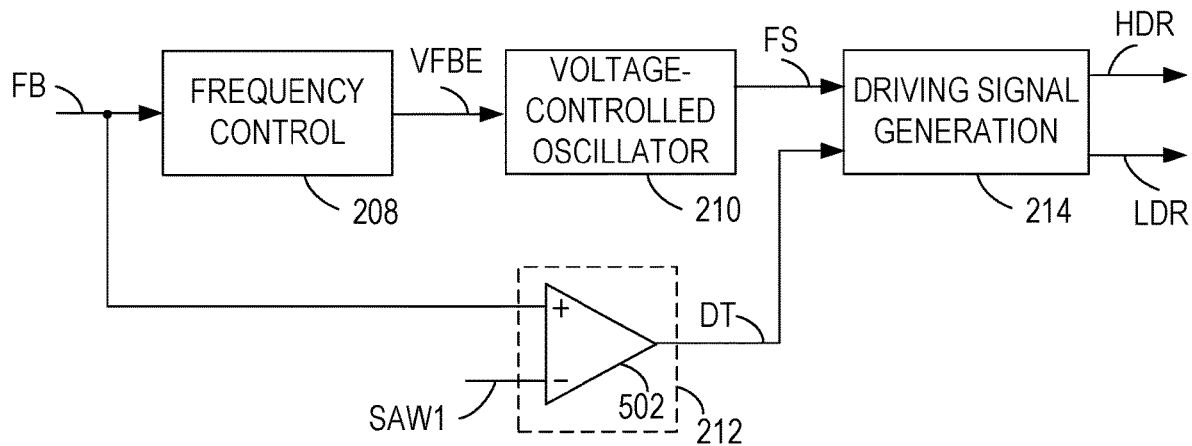
FIG. 5A shows components in a controller associated with a second mode, in accordance with embodiments of the present invention.
Figure 5B:
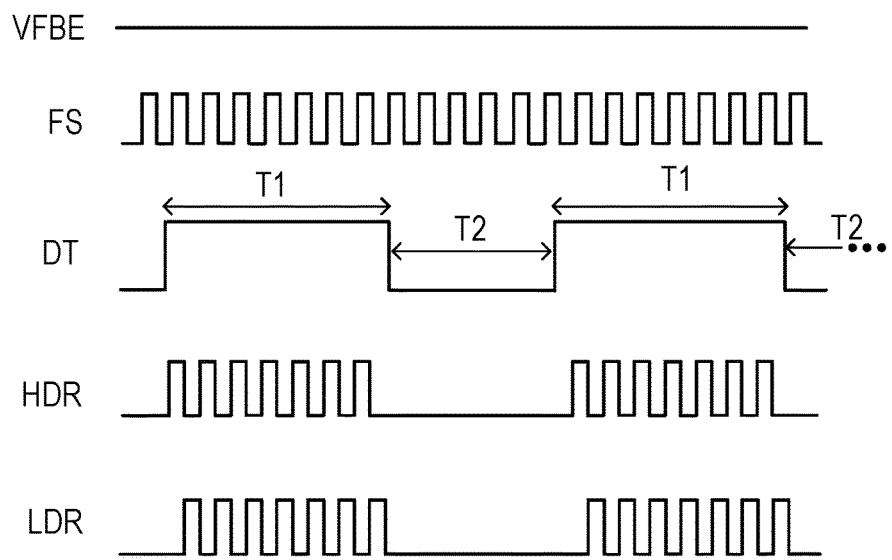
FIG. 5B shows signal waveforms of a controller associated with a second mode, in accordance with embodiments of the present invention.

FIG. 5A shows components in the controller 110 associated with the second mode, in accordance with embodiments of the present invention. FIG. 5B shows signal waveforms of the controller 110 associated with the second mode, in accordance with embodiments of the present invention. FIGS. 5A and 5B are described in combination with FIG. 2.

In the second mode (high frequency burst mode), operation of the frequency control unit 208 and the voltage-controlled oscillator 210 is similar to that of the first mode. The duty control unit 212 generates a duty control signal DT by comparing the feedback signal FB with the first sawtooth signal SAW1 having a first frequency. In an embodiment, the duty control unit 212 includes a comparator 502. The duty control signal DT can be a pulse-width modulation signal having a same frequency as that of the sawtooth signal SAW1. In each cycle, the duty control signal DT is in a first state (e.g., logic high) during a first time period T1 and is in a second state (e.g., logic low) during a second time period T2 successive to the first time period T1. The driving signal generation unit 214 generates the first driving signal HDR and the second driving signal LDR based on the switching signal FS from the voltage-controlled oscillator 210 and the duty control signal DT. More specifically, the driving signal generation unit 214 multiplies the switching signal FS with the duty control signal DT to generate the first driving signal HDR and the second driving signal LDR. In an embodiment, the driving signal generation unit 214 includes an AND gate. According to the first driving signal HDR and the second driving signal LDR, as shown in FIG. 5B, the high side switch Q1 and the low side switch Q2 are alternately turned on and off during the first time period T1 (one switch is on while the other switch is off), and are both off during the second time period T2 successive to the first time period T1. A length of the first time period T1 and a length of the second time period T2 are determined by comparing the feedback signal FB with the first sawtooth signal SAW1 having the first frequency. In an embodiment, the first frequency is configured to be not less than 20 KHz, such that the resonant converter will not produce audible noise in operation.

Figure 6A:
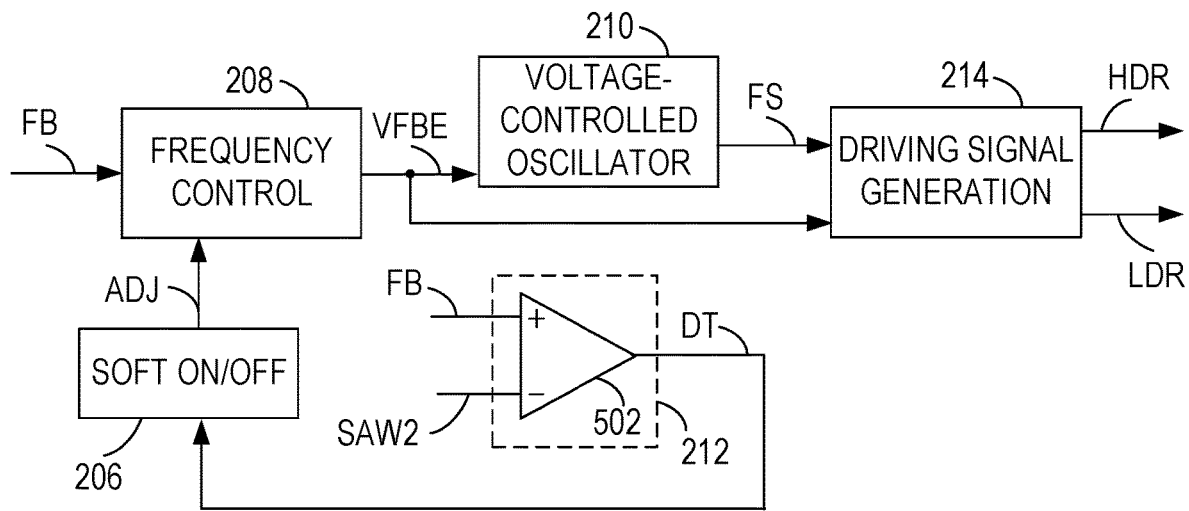
FIG. 6A shows components in a controller associated with a third mode, in accordance with embodiments of the present invention.
Figure 6B:
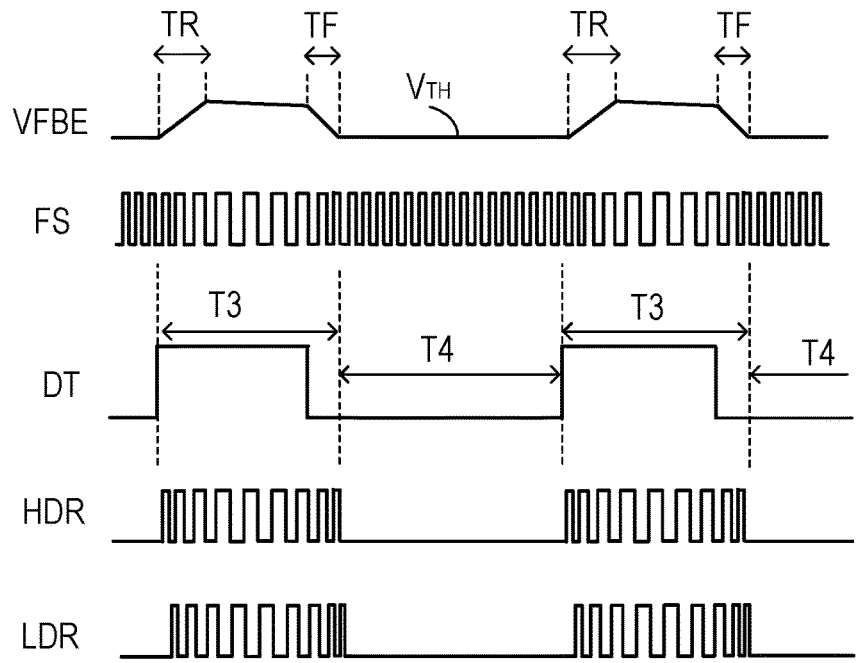
FIG. 6B shows signal waveforms of a controller associated with a third mode, in accordance with embodiments of the present invention.

FIG. 6A shows components in the controller 110 associated with the third mode, in accordance with embodiments of the present invention. FIG. 6B shows signal waveforms of the controller 110 associated with the third mode, in accordance with embodiments of the present invention. FIGS. 6A and 6B are described in combination with FIG. 2.

In the third mode (low frequency burst mode), the duty control unit 212 generates a duty control signal DT by comparing the feedback signal FB with the second sawtooth signal SAW2 having a second frequency. The duty control signal DT can be a pulse-width modulation signal having a same frequency as that of the sawtooth signal SAW2. The duty control signal DT is in a first state (e.g., logic high) if the feedback signal FB is greater than the second sawtooth signal SAW2, and is in a second state (e.g., logic low) if the feedback signal FB is less than the second sawtooth signal SAW2. In the third mode, the soft on/off unit 206, which is coupled to the voltage-controlled oscillator 210 through the frequency control unit 208, is enabled to gradually decrease the frequency of the switching signal FS during a time period TR after the duty control signal DT changes from the second state to the first state, and to gradually increase the frequency of the switching signal FS during a time period TF after the duty control signal DT changes from the first state to the second state. More specifically, the soft on/off unit 206 generates an adjustment signal ADJ to adjust the frequency control unit 208 such that the frequency control signal VFBE gradually increases during the time period TR and gradually decreases during the time period TF. The voltage-controlled oscillator 210 generates the switching signal FS based on the frequency control signal VFBE. In an embodiment, the frequency of the switching signal FS is inversely proportional to a level of the frequency control signal VFBE. The driving signal generation unit 214 generates the first driving signal HDR and the second driving signal LDR based on the frequency control signal VFBE and the switching signal FS. The frequency control signal VFBE is adjusted by the duty control signal DT. More specifically, during a third time period T3, the frequency control signal VFBE is above a threshold (e.g., an initial level VTH), and the driving signal generation unit 214 is enabled to generate the first driving signal HDR (which is in phase with the switching signal FS) and to generate the second driving signal LDR (which is phase-inverted of the first driving signal HDR). During a fourth time period T4, the frequency control signal VFBE is not above the threshold (e.g., the initial level VTH), and the driving signal generation unit 214 keeps the first driving signal HDR the second driving signal LDR in a second state (e.g., logic low).

Accordingly, as shown in FIG. 6B, the high side switch Q1 and the low side switch Q2 are alternately turned on and off during the third time period T3 (one switch is on while the other is off), and both are off during the fourth time period T4 successive to the third time period T3. A length of the third time period T3 and a length of the fourth time period T4 is determined by comparing the feedback signal FB with the second sawtooth signal SAW2 having the second frequency. In one embodiment, the first frequency is greater than (e.g., 100 times) the second frequency. For example, the first frequency is 20 KHz and the second frequency is 200 Hz. Moreover, the frequency of the high side switch Q1 and the frequency of the low side switch Q2 gradually decrease at the beginning of the third time period T3 and gradually increase at the end of the third time period T3. With such configuration, the audible noise produced by the resonant converter can be significantly reduced or eliminated.

As described above, disclosed is a controller for controlling a resonant converter. In addition to a normal mode, the controller further includes a high frequency burst mode and low frequency burst mode with soft on/off function. If the resonant converter receives a relatively high input voltage, and a low output voltage is required, the controller can operate in the high frequency burst mode or in the low frequency burst mode. In the high frequency burst mode, beside decreasing the output voltage by the switching signal FS according to the feedback FB, the controller can further decrease the output voltage by using a duty control signal DT. The duty control signal DT is configured to have a relatively high frequency (e.g., not less than 20 KHz) that is beyond the audible frequency of humans. In the low frequency burst mode, although the duty control signal DT has a relatively low frequency (e.g., 200 Hz), the soft on/off function can reduce or eliminate audible noise. The controller can dynamically switch among the normal mode, the high frequency burst mode, and the low frequency burst mode according to the input voltage level and the load condition. Advantageously, a controller according to present invention can enable the resonant converter to operate with a broader input voltage range (e.g., 90 $V_{AC}$ to 265 $V_{AC}$) and meanwhile the audible noise can be reduced or eliminated.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling a resonant converter, said controller comprising:
    a first sensing pin coupled to a power source and operable for receiving a first sensing signal indicating a level of an input voltage of said resonant converter provided by said power source;
    a second sensing pin coupled to said resonant converter and operable for receiving a second sensing signal indicating a level of an input current of said resonant converter;
    a feedback pin coupled to said resonant converter through a feedback circuit and operable for receiving a feedback signal indicating a level of an output voltage of said resonant converter;
    a first driving pin coupled to said resonant converter and operable for controlling a high side switch of said resonant converter; and
    a second driving pin coupled to said resonant converter and operable for controlling a low side switch of said resonant converter,
    wherein said controller is operable for: generating a compensated signal based on said first sensing signal, comparing said compensated signal with a peak value of said second sensing signal to generate a first comparison result, comparing said feedback signal with a threshold to generate a second comparison result, and controlling said high side switch and said low side switch based on said first and said second comparison results,
    wherein said controller is further operable for adjusting a frequency of said high side switch and said low side switch based on said feedback signal,
    wherein said controller is further operable for controlling said resonant converter to operate in a first mode, a second mode and a third mode based on said first and said second comparison results,
    wherein in said first mode, said high side switch and said low side switch are alternately turned on and off,
    wherein in said second mode, said high side switch and said low side switch are alternately turned on and off during a first time period, and said high side switch and said low side switch are off during a second time period successive to said first time period, and wherein said controller is further operable for determining a length of said first time period and a length of said second time period by comparing said feedback signal with a first sawtooth signal having a first frequency,
    wherein in said third mode, said high side switch and said low side switch are alternately turned on and off during a third time period, and said high side switch and said low side switch are off during a fourth time period successive to said third time period, wherein said controller is further operable for determining a length of said third time period and a length of said fourth time period by comparing said feedback signal with a second sawtooth signal having a second frequency, and
    wherein said first frequency is greater than said second frequency and said threshold is a peak value of said first sawtooth signal.

2. The controller of claim 1, further comprising:
    a peak detector coupled to said second sensing pin and operable for detecting said peak value of said second sensing signal.

3. The controller of claim 1, further comprising:
    a compensation unit coupled to said first sensing pin and operable for generating said compensated signal based on said first sensing signal, wherein said compensated signal is inversely proportional to said first sensing signal if said input voltage of said resonant converter is within a predetermined range.

4. The controller of claim 1, further comprising:
    a mode selection unit coupled to said first sensing pin and said second sensing pin and operable for:
    selecting a mode among said first mode, said second mode and said third mode based on said first sensing signal and said second sensing signal, and controlling said resonant converter to operate in said selected mode,
    wherein said mode selection unit is further operable for selecting said first mode if said peak value of said second sensing signal is greater than said compensated signal and said feedback signal is greater than said threshold,
    wherein said mode selection unit is further operable for selecting said second mode if said peak value of said second sensing signal is greater than said compensated signal and said feedback signal is less than said threshold, and
    wherein said mode selection unit is further operable for selecting said third mode if said peak value of said second sensing signal is less than said compensated signal.

5. The controller of claim 4, further comprising:
    a frequency control unit coupled to said feedback pin and operable for generating a frequency control signal based on said feedback signal; and
    a voltage-controlled oscillator coupled to said frequency control unit and operable for generating a switching signal having said frequency of said high side switch and said low side switch based on said frequency control signal.

6. The controller of claim 5, further comprising:
    a soft on/off unit coupled to said voltage-controlled oscillator, wherein in said third mode said soft on/off unit is operable for gradually decreasing said frequency at a beginning of said third time period and gradually increasing said frequency at an end of said third time period.

7. The controller of claim 5, further comprising:
a duty control unit coupled to said mode selection unit; and
a driving signal generation unit coupled to said duty control unit and said voltage-controlled oscillator,
wherein in said second mode said duty control unit is operable for generating a duty control signal by comparing said feedback signal with said first sawtooth signal, and said driving signal generation unit is operable for generating a first driving signal and a second driving signal based on said switching signal and said duty control signal,
wherein in said third mode said duty control unit is operable for generating said duty control signal by comparing said feedback signal with said second sawtooth signal, and said driving signal generation unit is operable for generating said first driving signal and said second driving signal based on said switching signal and said frequency control signal, wherein said frequency control signal is adjusted by said duty control signal,
wherein said first driving signal is output from said first driving pin to control said high side switch and said second driving signal is output from said second driving pin to control said low side switch.

8. The controller of claim 1, wherein said first frequency is 100 times greater than said second frequency.

9. The controller of claim 1, wherein said first frequency is not less than 20 KHz.

10. A controller for controlling a resonant converter, said controller comprising:
a mode selection unit, operable for: selecting a mode among a first mode, a second mode and a third mode based on a first sensing signal and a second sensing signal, and controlling said resonant converter to operate in said selected mode, wherein said first sensing signal indicates a level of an input voltage of said resonant converter, wherein said second sensing signal indicates a level of an input current of said resonant converter;
a peak detector coupled to said mode selection unit and operable for detecting a peak value of said second sensing signal; and
a compensation unit coupled to said mode selection unit and operable for generating a compensated signal based on said first sensing signal, wherein said compensated signal is inversely proportional to said first sensing signal if said input voltage of said resonant converter is within a predetermined range,
wherein said mode selection unit is further operable for: comparing said compensated signal with said peak value of said second sensing signal to generate a first comparison result, comparing a feedback signal with a threshold to generate a second comparison result, and determining said selected mode based on said first and said second comparison results,
wherein said feedback signal indicates a level of an output voltage of said resonant converter,
wherein said mode selection unit is further operable for selecting said first mode if said peak value of said second sensing signal is greater than said compensated signal and said feedback signal is greater than said threshold,
wherein said mode selection unit is further operable for selecting said second mode if said peak value of said second sensing signal is greater than said compensated signal and said feedback signal is less than said threshold,
wherein said mode selection unit is further operable for selecting said third mode if said peak value of said second sensing signal is less than said compensated signal,
wherein in said first mode, a high side switch and a low side switch in said resonant converter are alternately turned on and off,
wherein in said second mode, said high side switch and said low side switch are alternately turned on and off during a first time period, and said high side switch and said low side switch are off during a second time period successive to said first time period, wherein said controller is operable for determining a length of said first time period and a length of said second time period by comparing said feedback signal with a first sawtooth signal having a first frequency,
wherein in said third mode, said high side switch and said low side switch are alternately turned on and off during a third time period, and said high side switch and said low side switch are off during a fourth time period successive to said third time period, wherein said controller is further operable for determining a length of said third time period and a length of said fourth time period by comparing said feedback signal with a second sawtooth signal having a second frequency, and
wherein said first frequency is greater than said second frequency and said threshold is a peak value of said first sawtooth signal.

11. The controller of claim 10, wherein said first frequency is 100 times greater than said second frequency.

12. The controller of claim 10, wherein said first frequency is not less than 20 KHz.

13. The controller of claim 10, further comprising:
a frequency control unit coupled to said mode selection unit and operable for generating a frequency control signal based on said feedback signal; and
a voltage-controlled oscillator coupled to said frequency control unit and operable for generating a switching signal having a frequency based on said frequency control signal for controlling said high side switch and said low side switch.

14. The controller of claim 13, further comprising:
a soft on/off unit coupled to said voltage-controlled oscillator,
wherein in said third mode said soft on/off unit is operable for; gradually decreasing said frequency at a beginning of said third time period and gradually increasing said frequency at an end of said third time period.

15. The controller of claim 13, further comprising:
a duty control unit coupled to said mode selection unit; and
a driving signal generation unit coupled to said duty control unit and said voltage-controlled oscillator,
wherein in said second mode: said duty control unit is operable for generating a duty control signal by comparing said feedback signal with said first sawtooth signal, and said driving signal generation unit is operable for generating a first driving signal and a second driving signal based on said switching signal and said duty control signal,
wherein in said third mode: said duty control unit is operable for generating said duty control signal by comparing said feedback signal with said second sawtooth signal, and said driving signal generation unit is operable for generating said first driving signal and said second driving signal based on said switching signal and said frequency control signal, wherein said frequency control signal is adjusted by said duty control signal, and wherein said first driving signal controls said high side switch and said second driving signal controls said low side switch.

* * * * *